United States Patent [19]
Gelardi et al.

[11] Patent Number: 4,850,477
[45] Date of Patent: Jul. 25, 1989

[54] COMBINATION DISPLAY PACKAGE AND FLIP FILE HOLDER FOR COMPACT DISCS

[75] Inventors: Paul J. Gelardi; Anthony L. Gelardi, both of Cape Porpoise, Me.; Alan B. Lowry, Canton, Mass.; Craig S. Lovecky, Old Orchard Beach, Me.; Richard H. Farr, Woburn, Mass.

[73] Assignee: Shape Inc., Biddeford, Me.

[21] Appl. No.: 170,217

[22] Filed: Apr. 8, 1988

[51] Int. Cl.⁴ .................... B65D 85/57; B65D 85/672
[52] U.S. Cl. ................................ 206/45.19; 206/309; 206/387; 206/425
[58] Field of Search ................. 53/158, 173, 201, 255, 53/263, 397, 410, 442, 449, 452, 458, 457; 206/307, 309, 387, 425, 444, 560, 561, 564, 593, 45.14, 45.19, 45.33, 45.13; 211/40, 41; 220/22

[56] References Cited

U.S. PATENT DOCUMENTS

| | | | |
|---|---|---|---|
| 1,553,533 | 9/1925 | Vance | 220/22 |
| 2,781,125 | 2/1957 | Mills . | |
| 3,446,360 | 5/1969 | Gutierrez | 211/40 |
| 3,556,620 | 1/1971 | Gutierrez | 211/40 |
| 3,716,145 | 2/1973 | Gutierrez | 211/40 |
| 3,756,383 | 9/1973 | Kryter | 206/444 |
| 3,897,871 | 8/1975 | Zinnbauer | 211/40 |
| 4,062,448 | 12/1977 | Meighan | 206/497 |
| 4,212,401 | 7/1980 | Schweizer . | |
| 4,295,623 | 7/1980 | Schweizer . | |
| 4,627,535 | 12/1986 | Kirchner et al. . | |
| 4,629,067 | 12/1986 | Pavlik et al. . | |
| 4,657,146 | 4/1987 | Walters | 211/40 |
| 4,712,679 | 12/1987 | Lowe . | |

FOREIGN PATENT DOCUMENTS

| | | | |
|---|---|---|---|
| 8603327 | 6/1986 | PCT Int'l Appl. | 206/444 |
| 0187856 | 2/1937 | Switzerland | 206/45.19 |

*Primary Examiner*—Jimmy G. Foster
*Attorney, Agent, or Firm*—Staas & Halsey

[57] ABSTRACT

A combination display package and flip file holder has removable bars that hold two compact disc boxes on top of plural dividers in the display package mode. By removing the dividers, the display package converts into a flip file holder. A shrink-wrap outer covering around the entire structure helps keep the removable bars and compact disc boxes in place until after purchase.

27 Claims, 4 Drawing Sheets

COMBINATION DISPLAY PACKAGE AND FLIP FILE HOLDER FOR COMPACT DISCS

BACKGROUND OF THE INVENTION

1. Field of the Invention

The present invention relates to a package for an item or items sold on the retail market, and more particularly, to a combination display package and flip file holder for compact discs or compact cassettes.

2. Description of the Related Art

Small items are commonly marketed in selfservice retail outlets by affixing the item to a larger, relatively rigid package which is not easily shoplifted. In particular, audio tape cassettes and compact discs are typically packaged for retail in this manner. The recording medium, whether it be tape or disc, is usually enclosed in a hinged storage box having dimensions very similar to the recording medium and in which the recording medium is stored after purchase. This storage box, with the recording medium inside, is affixed to a larger package prior to sale and removed therefrom after purchase by the consumer.

There are several desirable aspects of the larger package. First, it should be relatively difficult to remove the storage box containing the recording medium from the package in a retail outlet without being observed. On the other hand, it should be relatively easy for the consumer to remove the storage box and the recording medium after purchase. In addition, it is desirable that the package be capable of displaying information about the recordings made on the recording medium to attract and inform purchasers. It is further desirable that the package provide some additional protection for the recording medium and provide all of the above features without adding excessively to the cost of the item, including the actual package and the manufacturing and assembly thereof.

There are two types of commonly used retail packages for compact discs, both of which are approximately six inches by twelve inches and less than an inch thick.

The first type of package is known as a "tuck box" and is made of a paperboard material with graphics printed directly thereon. The commonly used storage box for compact discs is known as a "jewel box". It is conventional to include a booklet with each compact disc. The booklet conventionally contains the album cover graphics and liner notes and may include listings of other recordings available from the same distributor. The jewel box and booklet are inserted into the tuck box which is then sealed. The tuck box is relatively expensive due to the custom graphics and is easily opened in a retail outlet. Due to its opaque construction, pilferage of a recording from a tuck box is difficult to discover. In addition, tuck boxes do not lend themselves easily to automated insertion and sealing of the jewel box and booklet.

The second commonly used retail package for compact discs is a blister pack which contains the jewel box and the booklet in separate blisters formed of a relatively sturdy transparent plastic. Such blister packs are relatively difficult to open by the consumer after purchase and do not provide a surface which can display graphical information or advertisement for easy viewing by a purchaser browsing through a retailer's display bin or the like.

After opening the aforementioned retail display and antitheft packages and removing the contents therefrom, the packages are discarded as trash. After collecting several compact discs, an owner is faced with a need for a convenient storage apparatus for the discs which is inexpensive and allows quick and easy access to the discs.

Flip-type file holders are convenient because several stored items can be scanned while "flipping" through the possible selections. As an example, U.S. Pat. No. 2,781,125 to Mills describes a flip file for photographic slides in which the slides are supported in a substantially vertical orientation in slots broad enough to allow movement of the slides by several degrees to either side of vertical. U.S. Pat. No. 4,629,067 to Pavlik et al. describes a diskette holder having semicircular grooves receiving end portions of the diskettes. An angled support is associated with each groove to support a diskette in an inclined position. Another type of flip file holder is described in U.S. Pat. No. 4,212,401 to Schweizer in which a rectangular frame is provided with grooves along the long sides for pivotally receiving a cassette-like container. None of these patents describes a single structure which can be used both as a display package and a flip file holder.

SUMMARY OF THE INVENTION

An object of the invention is to provide a display package which is easily and inexpensively manufactured and lends itself to automation of item packaging.

Another object of the present invention is to provide a display package which is easily opened by a consumer after purchase but difficult to open unobtrusively in a retail store prior to purchase.

Another object of the present invention is to provide a display package for an item which displays an item in such a manner that pilferage is easily discovered.

Yet another object of the present invention is to provide a display package for an item which provides maximum space for displaying information or advertisement.

A further object of the present invention is to provide a single structure that can be used both as a display package for marketing an item, and as a flip file holder for storage of the item, such as compact discs.

To achieve the foregoing and other objects of the present invention and in accordance with the purposes of the invention, there is provided a combination display package and flip file holder for compact discs including a rectangular box and a plurality of dividers extending upwardly from a bottom of the box, wherein distal ends of the plural dividers are coplanar and define a supporting surface for supporting thereon one or two compact disc boxes. Removable bars extending across the top of the rectangular box hold either one or two compact disc boxes between opposite side walls of the rectangular box and adjacent to opposite end walls of the rectangular box. The bars are snapfitted into holes provided in the side walls of the rectangular box, each bar having top and center walls which are positioned along an abutting edge of a compact disc box. When two removable bars are employed, a space formed between the two bars is fitted with a sheet of printed material such as an advertisement. The sheet is held between grooves of the removable bars. A shrink-wrap outer covering keeps the side walls of the rectangular box from flexing outwardly to release the snap-fit connection of the removable bars.

The snap-fit of the removable bars is made by pushing downwardly until hooked projections on opposite ends of the bar snap into the holes provided in the rectangular box. A snap-fit connection is also used to connect portions of the rectangular box.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Figure 1:
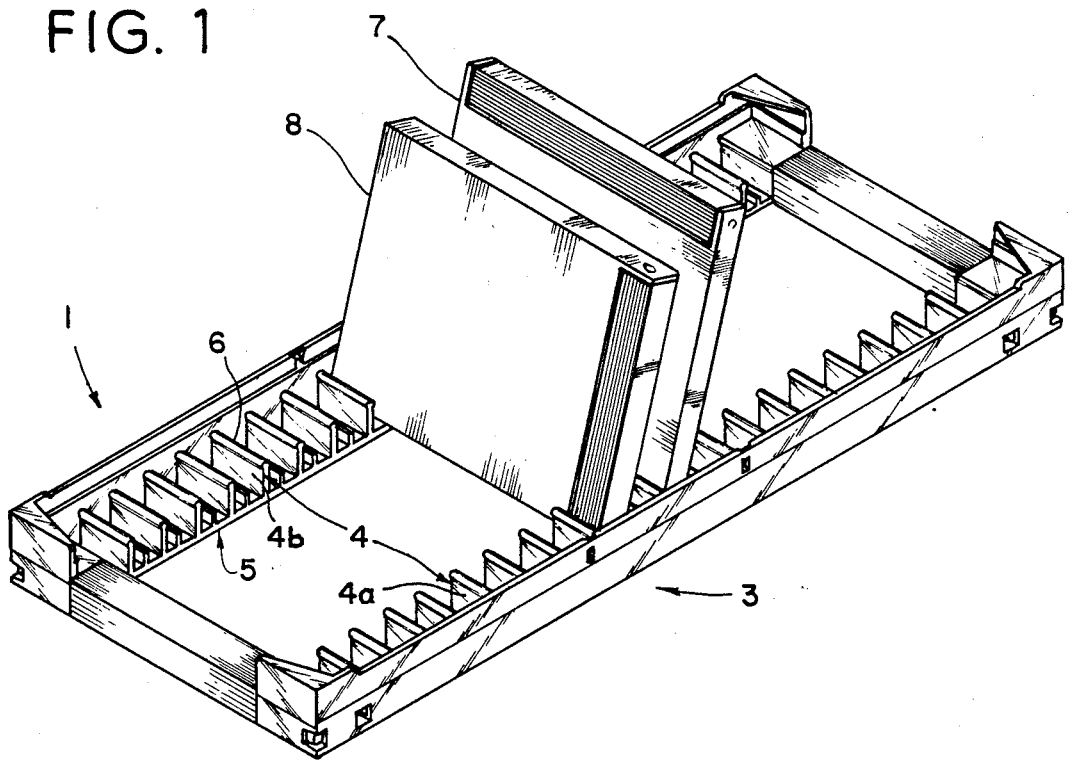
FIG. 1 is a perspective view of the combination display package and flip file holder of the preferred embodiment of the invention, showing in particular the flip file holder mode of use.
Figure 2:
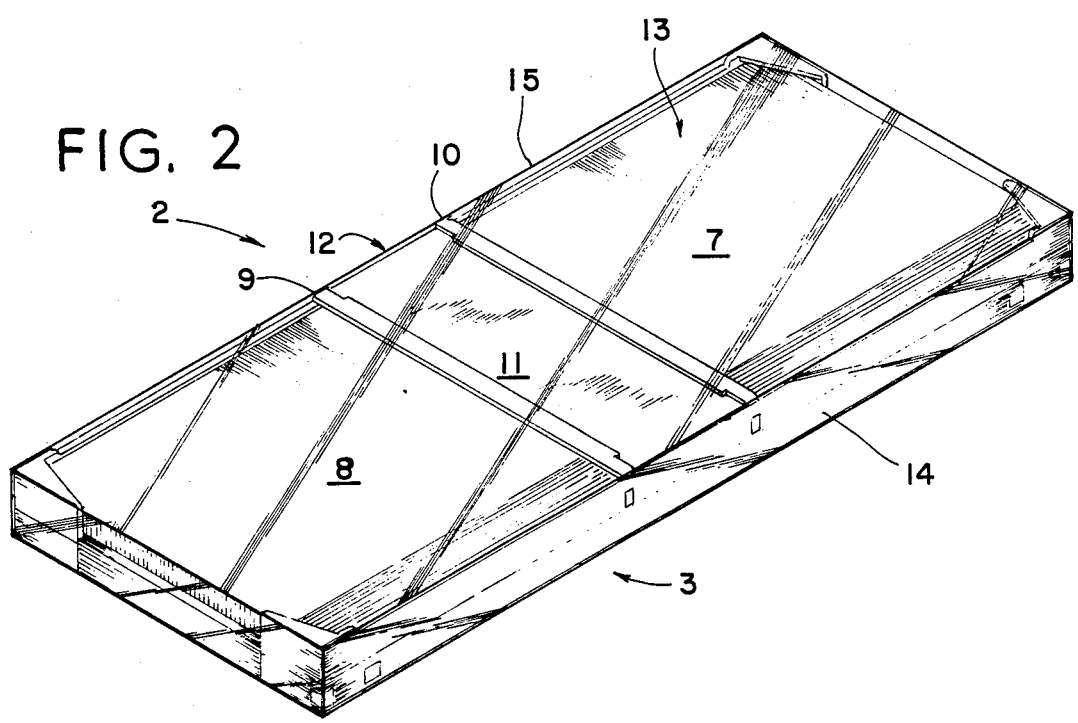
FIG. 2 is a perspective view of the combination display package and flip file holder of the preferred embodiment of the invention, showing in particular the display package mode of use.

In the preferred embodiment of the invention, a single structure is used as both a display package and as a flip file holder for compact discs. FIG. 1 shows the single structure in a flip file holder mode of use, while FIG. 2 shows the single structure in a display package mode of use. It is understood that the same basic structure is employed for both, although to convert from the display package mode of use to the flip file holder mode of use, certain components of the structure must be removed.

Figure 3:
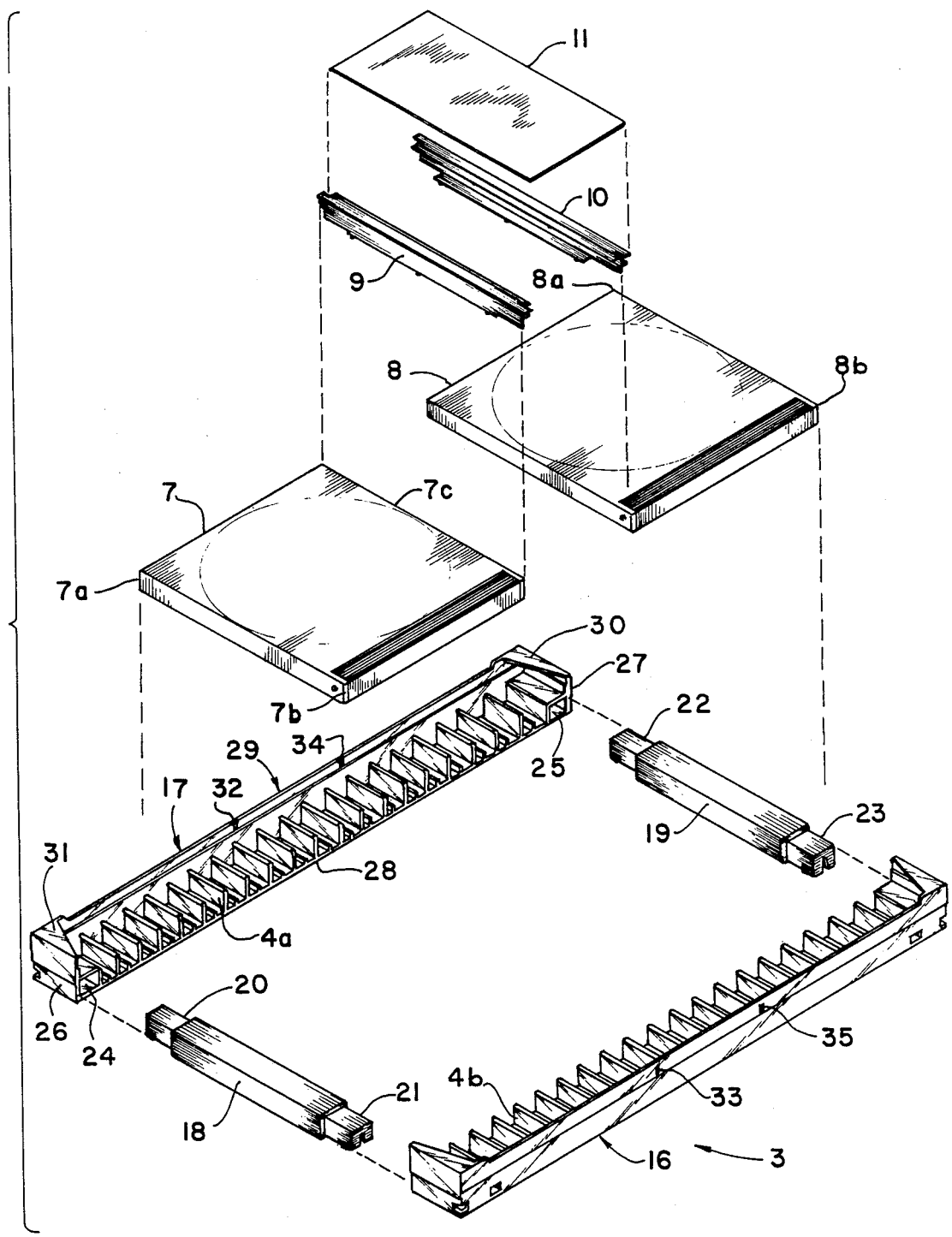
FIG. 3 is an exploded view of the embodiment of FIG. 2, less the shrink-wrap outer covering.

Referring to FIGS. 1-3, a combination display package and flip file holder includes a rectangular box 3 and a plurality of dividers 4 which extend upwardly from a bottom 5 of the rectangular box 3. A single divider 4 is defined by a pair of aligned partition walls 4a and 4b. Distal ends 6 of the plural dividers 4 are coplanar and define a supporting surface for supporting one or two compact disc boxes 7 and 8 in the display package mode of use shown in FIG. 2. Removable holding means such as removable bars 9 and 10 hold the compact disc boxes 7 and 8 in the horizontally supported position. A sheet 11 of printed material is fitted in a space 12 between the two removable bars 9 and 10 for the purpose of displaying advertisements or information about the compact discs contained in boxes 7 and 8. In FIG. 2, shrink-wrap outer cover 13 completely and tightly envelopes the rectangular box 3 with all components of the structure and the compact disc boxes assembled to complete the display package. When fully assembled, upper planar surfaces of the compact disc boxes 7 and 8 are substantially coplanar with the top of the rectangular box 3. Since the top of the box 3 is open except for small top corner walls, the compact disc boxes 7 and 8 and the sheet 11 collectively function as a top for the rectangular box 3. Preferably, the upper surface of the compact disc boxes 7 and 8 and sheet 11 are slightly below the top of the rectangular box.

To convert to the flip file holder of FIG. 1, the shrink-wrap outer cover 13 is removed. Then, opposite sides 14 and 15 of the rectangular box 3 are pulled outwardly at the location of the removable bars 9 and 10 to increase the distance between the sides 14 and 15. As a result, the removable bars 9 and 10 can be removed from their snap-fit connection.

The removable bars 9 and 10, the sheet 11 and the shrink-wrap outer covering 13 are discarded and the remaining structure is the flip file holder for storing a plurality of compact discs as shown in FIG. 1.

Referring to FIG. 3, the rectangular box 3 is formed as a rectangular-type frame having a large open center space formed by opposite side rails 16 and 17 which are spaced apart and parallel to each other, and interconnected through cross tie bars 18 and 19 which have snap-fitting ends 20, 21, 22 and 23 receivable in inwardly facing sockets provided at opposite ends of the side rails 16 and 17. Socket 24 receives and locks with end 20 of tie bar 18, while socket 25 receives and locks with end 22 of the bar 19. Opposite ends 21 and 23 are similarly received in and locked with corresponding sockets of side rail 16 (not shown).

Since both side rails 16 and 17 are identically shaped, a more particular description of both can be had by referring to FIGS. 4-9, which collectively show the details of side rail 17. Side rail 17 has orthogonally disposed opposite end walls 26 and 27, a bottom wall 28, a side wall 29, and top corner walls 30 and 31 cantilevered between the side wall 29 and each end wall 26 and 27. It is understood that the two bottom walls of two side rails 16 and 17 define the bottom 5 of the rectangular box 3. Because of the large open space between the two bottom walls, the bottom 5 of the rectangular box 3 is considered semi-open. This feature works together with the fact that the side rails 16 and 17 are made of translucent plastic to provide visual access to the contents of the display package. The plastic can be any suitable clear or substantially translucent plastic which is rigid yet slightly flexible so that the removable bars 9 and 10 can be removed.

Figure 4:
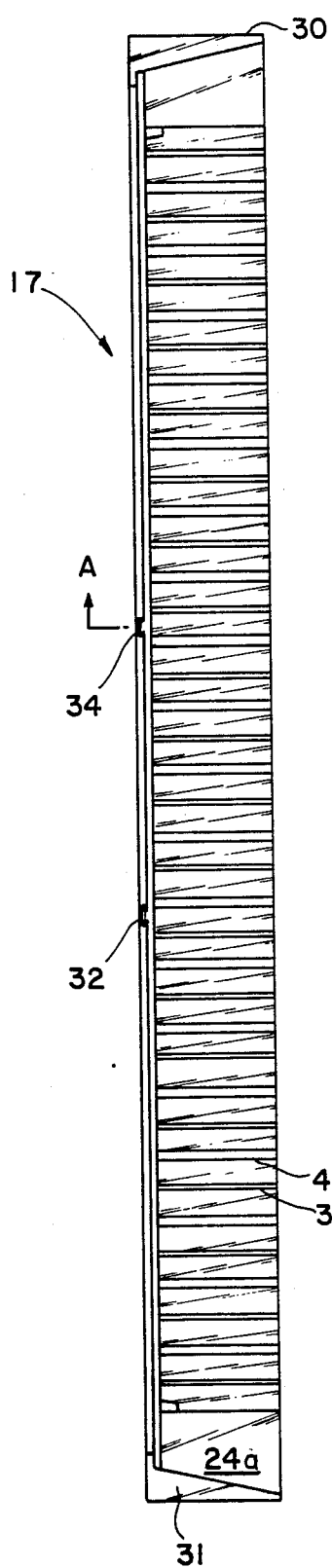
FIG. 4 is a top view of one side rail of the embodiment of FIG. 1 and FIG. 2.
Figure 5:
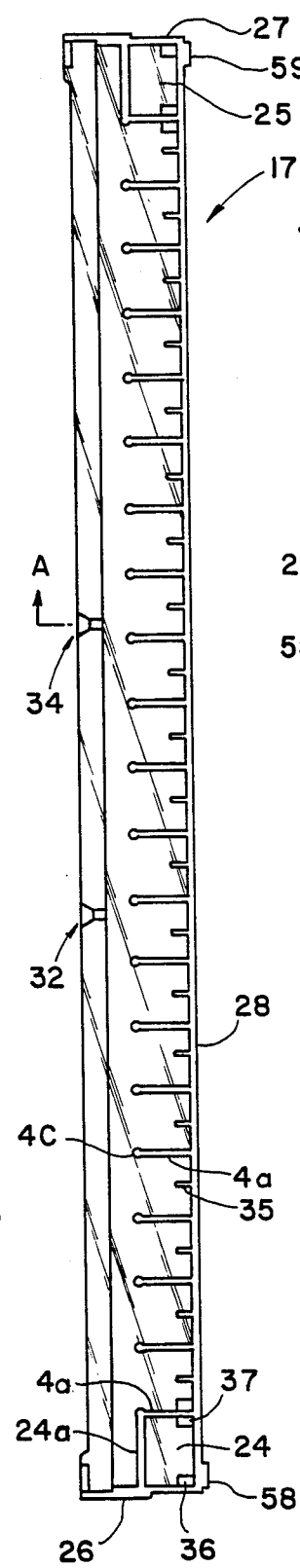
FIG. 5 is a side elevational view of the side rail of FIG. 4.

From FIGS. 4 and 5, a plurality of equidistantly spaced partition walls 4a extend upwardly from the bottom wall 28 of side rail 17. Identical partition walls 4b extend upwardly from the bottom wall of side rail 16 so that each aligned pair of partition walls 4a and 4b define a divider 4 as shown in FIG. 1. The dividers 4 are spaced apart to receive up to 20 compact disc boxes of the same dimensions as boxes 7 and 8. Compact disc boxes are usually rectangular but non-square. Therefore, the length of the partition walls 4a and 4b is calculated to accommodate a compact disc box no matter which side of the box is placed between two adjacent dividers 4. For instance, FIG. 1 shows boxes 7 and 8 oriented in both possible directions, i.e., a short side down and a long side down. The height and spacing of the partition walls 4a and 4b are calculated to define the limits of the flip movement for the compact disc boxes, whereby a more narrow spacing will result in a more restricted movement.

FIGS. 4 and 5 show side rail 17 having a plurality of partition walls 4a, each having a headed end 4c which prevents scratching of compact disc boxes supported between adjacent dividers 4. A plurality of short intermediate walls 35 extend upwardly from the bottom wall 28 of side rail 17. Intermediate walls 35 are positioned centrally between two adjacent partition walls 4a of side rail 17, and are aligned with intermediate walls (not shown) of side rail 16. A pair of aligned intermediate walls 35 define destabilizing means, in that when a compact disc box is placed on top of the aligned pair of intermediate walls from side rails 16 and 17, the box becomes unstable and will fall into an angled position and rest against one of two adjacent dividers 4. As the user "flips" through a selection of compact disc boxes, the intermediate walls help to orient the boxes in an angled disposition as shown in FIG. 1.

Figure 8:
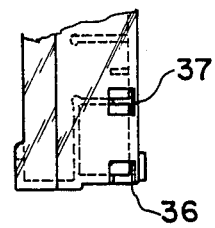
FIG. 8 is a partial opposite side elevational view of an end portion of the side rail of FIG. 4.
Figure 9:
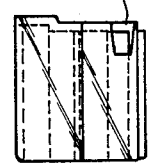
FIG. 9 is an end view of the side rail of FIG. 4.
Figure 10:
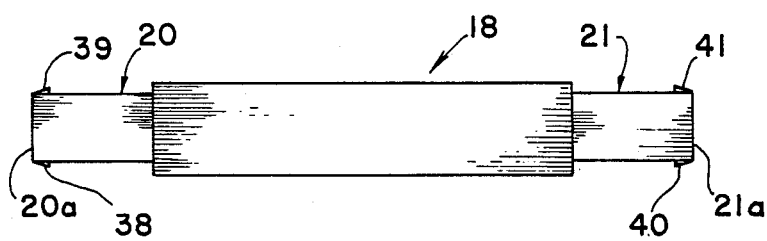
FIG. 10 is a top view of one tie bar of the preferred embodiment of the invention shown in FIG. 1.
Figure 11:
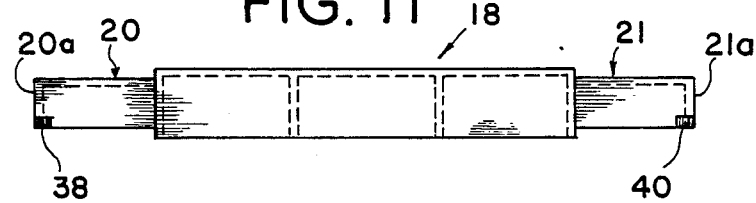
FIG. 11 is a side view of the tie bar of FIG. 10.
Figure 13:
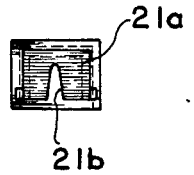
FIG. 13 is an end view of the tie bar of FIG. 10.
Figure 12:
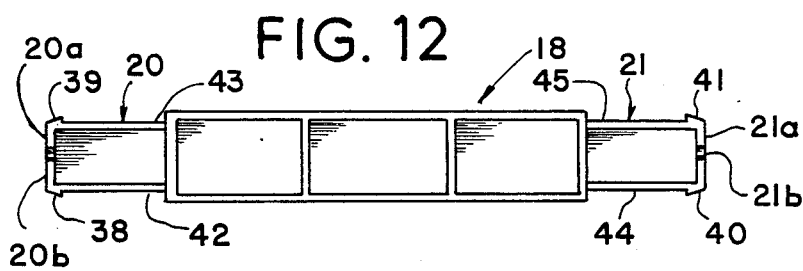
FIG. 12 is a bottom view of the tie bar of FIG. 10.
Figure 14:
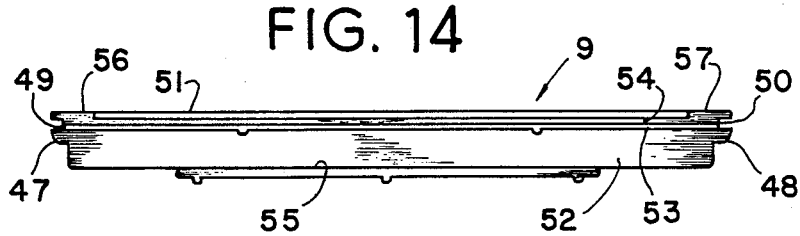
FIG. 14 is a side view of one removable bar of the preferred embodiment of the invention shown in FIG. 3.
Figure 18:
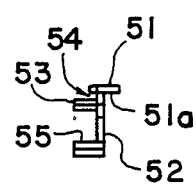
FIG. 18 is an end view of the removable bar of FIG. 14.
Figure 15:
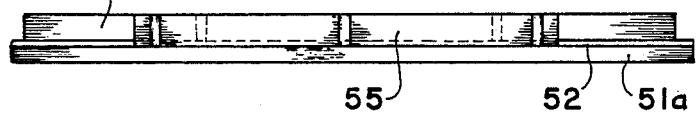
FIG. 15 is a bottom view of the removable bar of FIG. 14.
Figure 16:
FIG. 16 is a partial top view of an end portion of the removable bar of FIG. 14.
Figure 17:
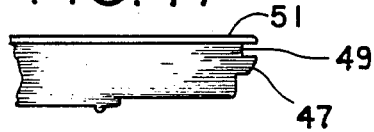
FIG. 17 is a partial opposite side view of the removable bar of FIG. 14.

Referring to FIG. 5, socket 24 is defined by part of bottom wall 28, part of end wall 26, a partition wall 4a and a flat wall 24a. Socket 25 is defined by the same structure, and sockets provided in side rail 16 are identical to sockets 24 and 25. Referring to FIGS. 5, 8 and 9 cut-outs or holes 36 and 37 in socket 24 facilitate the snap-fit interconnection between the tie bars 18 and 19, and side rails 16 and 17. Holes 36 and 37 are provided in the side walls of socket 24 so that when a tie bar is pushed into the socket, locking arms or hooked projections of the tie bar lock with the holes 36 and 37.

FIGS. 10–13 detail the locking portions of the tie bars. Tie bar 18 is a hollow opaque plastic molded piece which is identical to tie bar 19. Each end face 20a and 21a has a central cone-shaped split 20b and 21b. Opposite end portions 20 and 21 of tie bar 18 are provided with hooked side projections 38, 39, 40 and 41. The outer dimensions of end portions 20 and 21 coincide with the inner dimensions of the mating sockets. In order to insert an end portion 20, the side walls 42 and 43 for end position 20, or side walls 44 and 45 for end portion 21 must be flexed inwardly. The cone-shaped splits 20b and 21b accommodate the inward flex until the side projections 38, 39, 40 and 41 reach their respective locking holes, such as holes 36 and 37 of socket 24. Then, the side projections spring radially outwardly into the holes and create a one-way lock.

Figure 6:
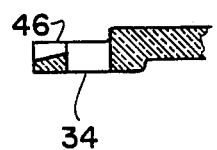
FIG. 6 is a detailed cross-sectional view taken through line A of FIG. 5.
Figure 7:
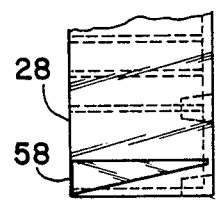
FIG. 7 is a partial bottom view of an end portion of the side rail of FIG. 4.

Referring to FIGS. 4–6, each of openings 32 and 34 in side rail 17, and openings 33 and 35 in side rail 16 (FIG. 3), has a sloping wedge portion 46 which angles longitudinally and radially inwardly to guide the hooked projections of removable bars 9 and 10 into their respective openings.

In FIGS. 14–18, removable bar 9 is shown in more detail, it being understood that removable bar 9 is identical to removable bar 10. Removable bar 9 has opposite end hooked projections 47 and 48 which are sloped outwardly at sides thereof to cooperate with the sloping wedge portions 46 of holes 32 and 33. The normal width between the sides 14 and 15 of the rectangular box 3 coincide with the length of the bar 9 between notches 49 and 50. The removable bar 9 is pressed downwardly between holes 32 and 33 such that hooked projections 47 and 48 cause sides 14 and 15 to flex outwardly until the projections 47 and 48 snap-fit into holes 32 and 33, whereupon the sides 14 and 15 return to their normal disposition Removable bar 9 includes a top wall 51 and a center wall 52. A ledge 53 extends outwardly from one side of the center wall 52, and a groove 54 is formed between the top wall 51 and ledge 53. A portion 51a of the top wall 51 that overlies a side of the center wall 52 opposite the groove 54 holds an upper edge 7c of a compact disc box 7 (see FIG. 3) after snap-fitting into place. A lower ledge 55 is formed orthogonally at the bottom of center wall 52 and has a length corresponding to the distance between the partition wall pairs 4a and 4b of opposite side rails 16 and 17. Top wall 51 has cu-tout areas 56 and 57 at opposite ends above the ledge 53 so that sheet 11 can be slid between two opposing grooves 54 of removable bars 9 and 10 after snap-fitting into place. If only one removable bar is used to hold only one compact disc box, the lower ledge 55 can be used to hold printed material placed in the space before the lower ledge 55 and one of the opposite ends of the rectangular box 3 not occupied by a compact disc box.

After assembling the rectangular box 3, two compact disc boxes 7 and 8 are placed on top of the dividers 4 with corners 7a and 7b of compact disc box 7 being placed in the corners of the side rails 17 and 16, respectively. Corner 7a is held against inner surfaces of end wall 26 and side wall 29 and in between an inner surface of top corner wall 31 and an outer surface of socket 24. Similar arrangements are made for corner 7b of compact disc box 7 and corners 8a and 8b of compact disc box 8. Next, the removable bars 9 and 10 are snap-fitted, either consecutively or simultaneously, into hole pairs 32, 33 and 34, 35. After snap-fitting, sheet 11 is placed between removable bars 9 and 10. Alternatively, the two removable bars 9 and 10 and the sheet 11 are pre-assembled and together snap-fitted into the holes 32, 33, 34 and 35. After snap-fitting the removable bars 9 and 10 and placing the sheet 11 therebetween, the rectangular box 3 is shrink-wrapped with a shrink-wrap outer covering 13 (see FIG. 2) to complete the display package. The shrink-wrap covering 13 prevents premature outward flexing of the opposite sides 14 and 15 of the rectangular box 3 which might cause separation of the removable bars 9 and 10.

Referring to FIGS. 4, 5 and 7–9, the top corner walls 30 and 31 of side rail 17 are wedge-shaped, with the wedge pointing inwardly. The bottom wall 28 of the side rail 17 has integrally formed wedge-shaped ribs 58 and 59 at opposite ends, with the wedge pointing outwardly. When two display packages are stacked vertically on top of each other, the top corner walls 30 and 31 of one display package form complementary angles with corresponding lower wedge-shaped feet 58 and 59 of the other package, thereby providing means for evenly stacking plural display packages.

Adhesively attached non-skid pads (not shown) may be provided near each rib 58 and 59 to keep the rectangular box 3 from sliding when in use as flip file holder.

The foregoing is considered illustrative only of the principles of the invention. Further, since numerous modifications and changes will readily occur to those skilled in the art, it is not desired to limit the invention to the exact construction and operation shown and described. Accordingly, all suitable modifications and equivalents may be resorted to, falling within the scope of the invention and the appended claims.

What is claimed is:

1. A combination retail display package and flip file holder for a compact disc or a cassette contained in a storage box, comprising:
   (a) a rectangular box having (i) a bottom, (ii) opposite sides, (iii) opposite ends, (iv) an open top, (v) means, including a plurality of dividers extending upwardly from the bottom of the rectangular box, for defining a flip file holder for holding a plurality of compact disc or cassette storage boxes in substantially upright positions, and (vi) means of defining a surface for supporting at least one storage box in a substantially coplanar position with the top; and
   (b) means, removably attachable to the rectangular box, for temporarily securing at least one storage box positioned on the supporting surface and forming an initial retail display package where at least one side contents of a storage box positioned on the supporting surface is visually displayed.

2. A combination display package and flip file holder as recited in claim 1, wherein the securing means comprises a removable bar connectable transversely between the opposite sides of the rectangular box at a position to hold a first storage box with the compact disc or cassette contained therein between one of the opposite ends of the rectangular box an the removable bar.

3. A combination display package and flip file holder as recited in claim 2, wherein the securing means further comprises an outer shrink-wrap covering of translucent plastic material enveloping the rectangular box.

4. A combination display package and flip file holder as recited in claim 1, wherein the securing means comprises an outer shrink-wrap covering of translucent plastic material enveloping the rectangular box having a first storage box with the compact disc or cassette contained therein positioned on the supporting surface.

5. A combination display package and flip file holder for a compact disc located in a compact disc storage box, comprising:
   a rectangular box having a bottom, opposite sides, opposite ends, and an open top;
   a plurality of dividers having coplanar distal ends and extending upwardly from the bottom, wherein the coplanar distal ends of the plurality of dividers define a supporting surface; and
   removable holding means, attachable to the rectangular box, for temporarily securing a compact disc box with a compact disc container therein on the supporting surface between the opposite sides of the box, the disc box being substantially coplanar with the top of the rectangular box when secured on the supporting surface for display of the contents of the compact disc box in a display package.

6. A combination display package and flip file holder as recited in claim 5, further comprising destabilizing means, disposed between adjacent dividers, for destabilizing compact disc boxes disposed between adjacent dividers, thereby causing the compact disc boxes to rest in a forwardly or rearwardly angled disposition.

7. A combination display package and flip file holder as recited in claim 6, wherein the destabilizing means comprise a plurality of short intermediate walls disposed between adjacent dividers and extending upwardly from the bottom of each side rail.

8. A combination display package and flip file holder as recited in claim 5, wherein the distal ends of the dividers are headed.

9. A combination display package and flip file holder as recited in claim 1, wherein the removable holding means comprises, a first removable bar connectable transversely between the opposite sides of the rectangular box at a position to hold a first compact disc box between one of the opposite ends of the rectangular box and the removable bar.

10. A combination display package and flip file holder as recited in claim 9, further comprising
    an outer shrink-wrap covering of translucent plastic material enveloping the rectangular box.

11. A combination display package and flip file holder as recited in claim 9, wherein the removable bar includes a center wall with hooked projections at opposite axial ends for snap-fitting into corresponding holes provided in the opposite sides of the rectangular box, and a top wall formed integrally with the center wall, the top wall being in a position to hold the first compact disc box between the supporting surface and an inner surface of the top wall.

12. A combination display, package and flip file holder as recited in claim 11, wherein the removable holding means further comprises a second removable bar, connectable between the opposite sides of the rectangular box at a position spaced from the first removable bar, and being in a position for holding a second compact disc box between the supporting surface and the inner surface of the top wall of the second removable bar.

13. A combination display package and flip file holder as recited in claim 12, wherein the opposite sides of the rectangular box each have a lower portion and an off-set upper portion defining a step therebetween, wherein the corresponding holes for snap-fitting the first and second removable bars are provided in the upper portions of each side wall, and wherein the first and second removable bars have opposite ends provided with shoulders that abut the steps between the upper and lower portions of the step of each side of the rectangular box.

14. A combination display package and flip file holder as recited in claim 13, wherein the sides of the rectangular box are flexible outwardly to facilitate connection and removal of the first and second removable bars.

15. A combination display package and flip file holder as recited in claim 12, wherein each removable bar has a groove substantially coplanar with the top of the rectangular box, and wherein the groove of one removable bar opposes the groove of the other removable bar.

16. A combination display package and flip file holder as recited in claim 15, further comprising
    a sheet of printed material held between the opposing grooves of the first and second removable bars.

17. A combination display package and flip file holder as recited in claim 16, further comprising
    an outer shrink-wrap covering of translucent plastic material enveloping the rectangular box.

18. A combination display package and flip file holder as recited in claim 5, further comprising an outer shrink-wrap covering of translucent plastic material enveloping the rectangular box.

19. A combination display package and flip file holder for compact discs, comprising:
 (a) a rectangular box having an open top, wherein the rectangular first and second opposite side rails spaced apart and parallel to each other each side rail having opposite end walls, a bottom wall, a side wall, a top corner wall disposed at each corner between the side wall and opposite end walls, and a plurality of equidistantly spaced partition walls extending upwardly from the bottom wall for forming a plurality of dividers with coplanar distal ends, wherein the coplanar distal ends of the plurality of dividers define a supporting surface; and
 (b) removable holding means for holding at least one compact disc box on the supporting surface between the opposite sides of the box.

20. A combination display package and flip file holder as recited in claim 19, wherein the plurality of partition walls of the first side rail are aligned with the plurality of partition walls of the second side rail to form pairs of aligned partition walls, and wherein the pairs of partition walls define the plurality of dividers.

21. A combination display package and flip file holder as recited in claim 19, wherein the first and second side rails are each made of one-piece molded translucent plastic.

22. A combination display package and flip file holder as recited in claim 19, further comprising first and second tie bars interconnecting the first and second side rails.

23. A combination display package and flip file holder as recited in claim 22, wherein the first and second tie bars have opposite end portions, and the first and second side rails have inwardly facing sockets disposed at opposite ends thereof, and wherein the end portions of the first and second tie bars are insertable into the sockets of the first and second side rails and locked in place by locking means.

24. A combination display package and flip file holder as recited in claim 23, wherein the locking means comprises snap-fitting side projections provided on opposite side walls of the opposite end portions of the tie bars, and complementary openings provided in the sockets for receiving the projections.

25. A method of assembling a combination display package and flip file holder comprising:
 forming a rectangular box having a bottom, opposite sides, opposite ends, an open top, and a plurality of dividers having coplanar distal ends extending upwardly from the bottom, wherein the coplanar distal ends of the plural dividers define a supporting surface;
 placing a first compact disc box on the supporting surface between the opposite sides of the rectangular box and next to one of the opposite ends of the rectangular box;
 detachably connecting a first removable bar between the opposite sides of the rectangular box next to the first compact disc box, the removable bar having a center wall preventing movement of the compact disc box along the supporting surface and an integrally formed top wall preventing movement of the compact disc box away from the supporting surface; and
 shrink-wrapping the rectangular box with a transparent plastic covering.

26. A method of assembling as recited in claim 25, further comprising, before shrink-wrapping,
 placing a second compact disc box on the supporting surface next to the other opposite end of the rectangular box, and
 detachably connecting a second removable bar between the opposite sides of the rectangular box next the second compact disc box, the first and second removable bars being spaced apart.

27. A method of assembling as recited in claim 25, further comprising, before shrink-wrapping,
 inserting a sheet of printed material between the first and second removable bars.

* * * * *